United States Patent
Di Benedetto (10) Patent No.: US 7,281,138 B1
(45) Date of Patent: Oct. 9, 2007

(54) METHOD AND APPARATUS FOR CONTROLLING ACCESS TO DEBUGGING SOFTWARE

(75) Inventor: Marco Di Benedetto, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 671 days.

(21) Appl. No.: 10/407,344

(22) Filed: Apr. 3, 2003

(51) Int. Cl.
 *G06F 11/30* (2006.01)
(52) U.S. Cl. ..................................... 713/189
(58) Field of Classification Search ................. 713/189
 See application file for complete search history.

(56) References Cited

U.S. PATENT DOCUMENTS

| | | | |
|---|---|---|---|
| 6,356,941 B1 * | 3/2002 | Cohen | 709/219 |
| 6,418,543 B1 | 7/2002 | Goli et al. | 714/38 |
| 6,654,348 B1 | 11/2003 | Doty, II et al. | 370/244 |
| 2001/0034846 A1 * | 10/2001 | Beery | 713/201 |
| 2001/0044902 A1 * | 11/2001 | Shavit | 713/200 |
| 2002/0002608 A1 * | 1/2002 | Aspromonte et al. | 709/223 |
| 2004/0133790 A1 * | 7/2004 | Hensley | 713/191 |

OTHER PUBLICATIONS

RFC1470, Jun. 1993, URL: http://www.faqs.org/rfcs/rfc1470.html.*
Microsoft Computer Dictionary, copyright 2002, ISBN: 0-7356-1495-4, p. 409.*

* cited by examiner

*Primary Examiner*—Kambiz Zand
(74) *Attorney, Agent, or Firm*—Beyer Weaver LLP (57) ABSTRACT

A software module includes a functional portion for day-to-day management and configuration of one or more network devices. During the development of the functional portion, the software module also includes a debugging portion, used primarily for debugging and troubleshooting the functional portion. Customer access to the debugging portion is limited in various ways. The functional portion may be shipped to customers without the debugging portion, or at least without most of the debugging portion. The debugging portion (or part of the debugging portion) may be provided only on an "as-needed" basis. If part of the debugging portion is shipped with the functional portion, special permission may be required to "unlock" that part. Part of the debugging portion may be provided separately from the functional portion, for example in the form of a downloadable plug-in. Moreover, access to commands for controlling the debugging portion is limited.

17 Claims, 11 Drawing Sheets

METHOD AND APPARATUS FOR CONTROLLING ACCESS TO DEBUGGING SOFTWARE

BACKGROUND OF THE INVENTION

1. Field of the Invention

This invention pertains generally to network devices and more particularly to controlling access to commands used for, e.g., the troubleshooting and debugging of network devices.

2. Description of the Related Art

Figure 1:
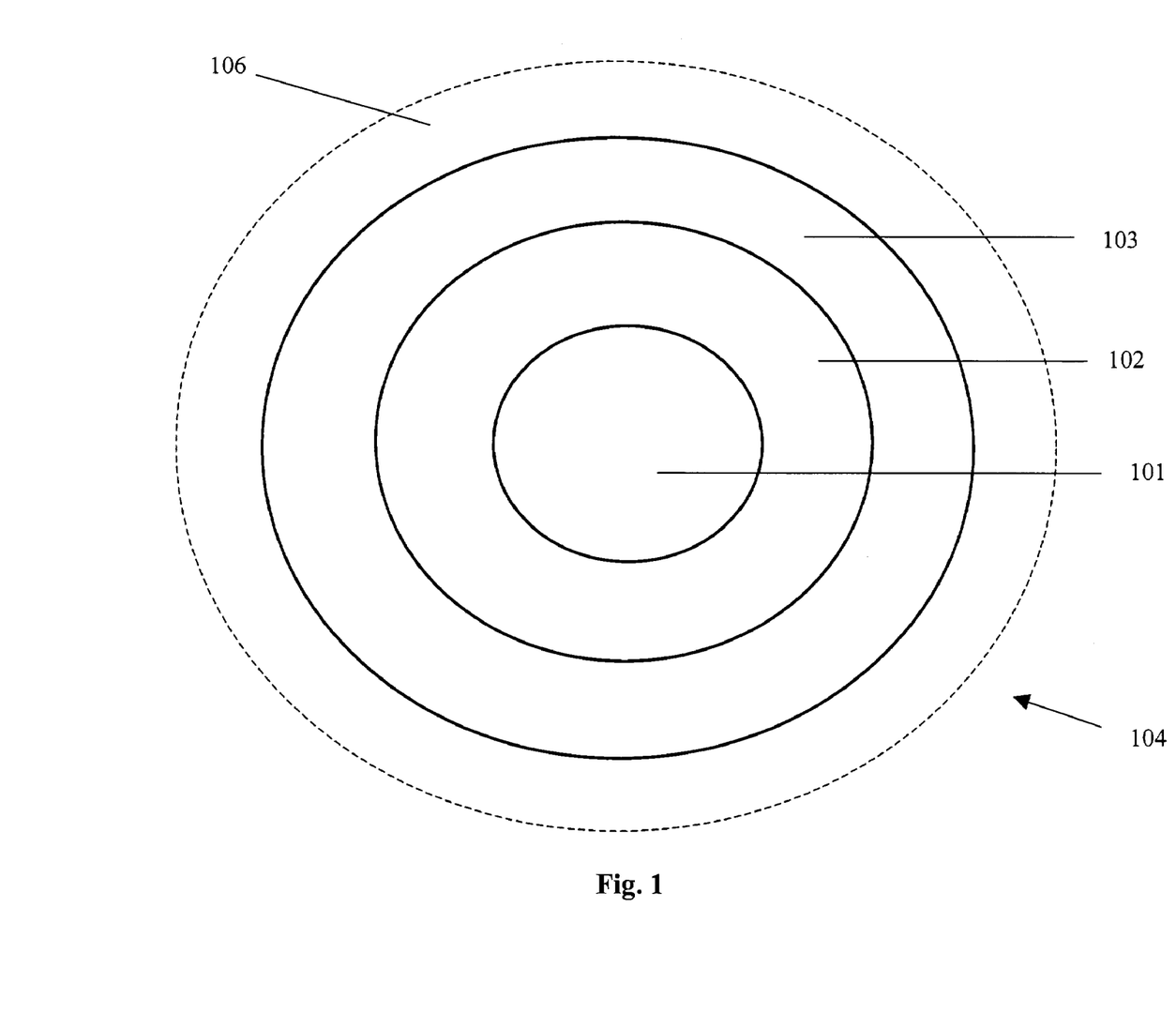
FIG. 1 illustrates the allocation of various levels of commands for controlling one or more network devices.

Currently, different levels for privileges are granted to groups of users in a hierarchical allocation of administrative commands, each group having a common password. For example, as shown in FIG. 1, low-level administrators may be able to use a basic group 101 of commands for the basic management of a particular network device. Typically, such commands would include a "show" command for determining configuration states of network devices. All administrators who are involved with the day-to-day management of that device will know the password appropriate for basic command group 101.

A more restricted number of people will know the password for an "execute" command group 102, which will allow additional commands for the day-to-day operation of network devices.

An even smaller group will have the password for "configuration" command group 103, which includes commands for configuring network devices. Permission to use configuration command group 103 may be assigned, for example, to one or more network administrators. Command group 103 may also include basic troubleshooting and debugging commands for network devices. Collectively, command groups 101, 102 and 103 can control files that are sometimes referred to herein as "functional" software.

Engineering command group 106 includes commands for developing, troubleshooting and debugging the functional software. Accordingly, engineering command group 106 is used to control files such as debugging software that is used during the development of the functional software and is often shipped to customers with the functional software. In an ideal world, the functional software would work perfectly at all times, regardless of a customer's actions, and engineering command group 106 would not be needed after the functional software were shipped to a customer. In the real world, however, engineering command group 106 and the associated debugging software are needed to perform special operations, such as debugging the software code that controls customers' network devices.

Existing methods for granting access to engineering command group 106 and the debugging software have at least two general problems. First, there is the category of problems associated with granting access to commands that can, when used by a typical network administrator, cause a network device to malfunction. For example, allowing a typical customer to use engineering command group 106 could cause problems in an otherwise fully operational network device. This is true in part because only the developers of the underlying software will have the expertise necessary to debug this software. Therefore, the commands of engineering command group 106 are preferably not accessible by anyone unfamiliar with the development process of that software.

If engineering command group 106 and the debugging software are installed in a network device, the debugging software will be available when high-level troubleshooting and debugging are required. However, if engineering command group 106 and the associated debugging software are shipped with the functional software, a customer may find a way to use engineering command group 106. For example, customers may determine how to use a "root" account that includes permission to use commands of engineering command group 106 that should not be used by a customer. If the customer uses commands from engineering command group 106 but cannot determine how to use these commands properly, this may cause network problems and customer dissatisfaction.

The other general category of problems arises because the debugging software is used during development of the functional software and therefore includes confidential information regarding the development of the network device, the functional software, etc. Therefore, if the debugging software is shipped with a network device, this confidential information will be accessible to those who are sophisticated enough to access it. This is true even if access to the debugging software is disabled (e.g., by denying access to engineering command group 106), because such confidential information is still accessible to those who know how to access it.

It would be desirable to have engineering command group 106 and the associated debugging software available when needed, but not otherwise. Moreover, it would be desirable to preclude access to the confidential information that is typically part of the debugging software.

SUMMARY OF THE INVENTION

Methods and devices are provided for the troubleshooting and debugging of network devices of network devices. In preferred implementations of the invention, a software module includes a functional portion for day-to-day management and configuration of one or more network devices. During the development of the functional portion, the software module also includes a debugging portion, used primarily for debugging and troubleshooting the functional portion.

Customer access to the debugging portion is limited in various ways. The functional portion may be shipped to customers without the debugging portion, or at least without most of the debugging portion. The debugging portion (or part of the debugging portion) may be provided only on an "as-needed" basis. If part of the debugging portion is shipped with the functional portion, special permission may be required to "unlock" that part. Part of the debugging portion may be provided separately from the functional portion, for example in the form of a downloadable plug-in. Moreover, access to commands for controlling the debugging portion is limited.

Some implementations of the invention provide a method of controlling access to debugging software for debugging a software code that controls one or more network devices. The method includes the step of developing, by a vendor, a first software module that comprises the following: a functional portion for day-to-day management and configuration of one or more network devices; and a debugging portion for debugging and troubleshooting the functional portion. The method also includes the following steps: forming a second software module by removing at least a first part of the debugging portion from the first software module; shipping the second software module to a customer; and providing, after the second software module has been shipped to the customer, at least a second part of the debugging portion for debugging the second software module.

The forming step may leave a third part of the debugging portion as part of the second software module. The shipping step may include shipping the functional portion and the third part of the debugging portion to the customer. Alternatively, the forming step may leave no part of the debugging portion as part of the second software module.

The providing step may involve forming the second part of the debugging portion as a plug-in and making the plug-in available to an operator for debugging and troubleshooting the functional portion. The plug-in may only be accessible for a limited period of time. The providing step may involve providing the second part of the debugging portion to an operator acting under the authority of the vendor. The providing step may involve granting permission to unlock the third part of the debugging portion.

The method may also include the step of testing the second software module prior to the shipping step. The method may also include the step of making available a command group for controlling the second part of the debugging portion, wherein the testing step is performed with the command group. The testing step may be performed with software included in the second part of the debugging portion.

Some embodiments of the invention provide a debug plug-in for controlling a computing device to perform troubleshooting and debugging operations. The debug plug-in may be formed according to the following process: developing a first software module that comprises a functional portion for day-to-day management and configuration of one or more network devices; and a debugging portion for debugging and troubleshooting the functional portion; selecting files from at least a part of the debugging portion; and storing the selected files in a computer-readable storage medium.

The debug plug-in may be formed by the additional step of compressing the selected files before the selected files are stored in the computer-readable storage medium. The debug plug-in may be formed by the additional step of adding authentication information to the selected files before the selected files are stored in the computer-readable storage medium.

Alternative embodiments of the invention provide a network device controlled in part by a first software module comprising a functional portion that includes software for day-to-day management and configuration of the network device, the network device configured to download a plug-in comprising a second software module for debugging the first software module, the second software module comprising software used in the development of the first software module.

The network device may be further configured to revise a password file according to information in the second software module. The network device may be configured to select software from the second software module to debug the functional portion. The network device may select software from the first software module to debug the functional portion.

BRIEF DESCRIPTION OF THE DRAWINGS

FIG. 5 is a flow chart that outlines a generalized process of developing a debug plug-in.

FIG. 6 is a flow chart that outlines a generalized process of using a debug plug-in.

FIG. 7 is a flow chart that outlines a more detailed process of using a debug plug-in.

DETAILED DESCRIPTION OF THE INVENTION

Figure 1A:
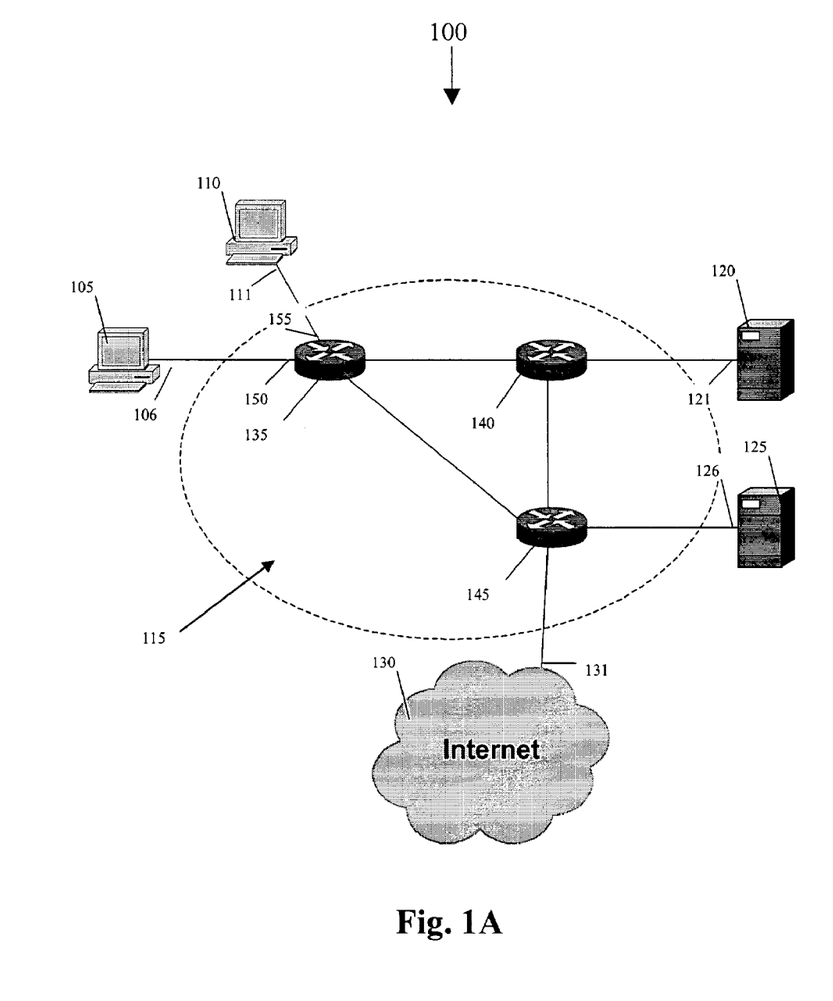
FIG. 1A illustrates a network that may be used in implementing the present invention.

FIG. 1A depicts exemplary network 100 for implementing some aspects of the present invention. According to some embodiments, network 100 is a storage area network ("SAN"). According to some such embodiments, the physical components of network 100 define a SAN that has been partitioned into a plurality of virtual storage area networks ("VSANs"). VSANs are the subject of various patent applications assigned to Andiamo Systems, Inc. One such application is U.S. patent application Ser. No. 10/034,160, which is hereby incorporated by reference for all purposes.

Nodes 105 and 110 are used by customers to communicate with storage device 120, storage device 125, Internet 130 or other networks via fabric 115. Nodes 105 and 110 may be host devices such as personal computers or any other convenient devices for interacting with fabric 115. Moreover, while only 2 nodes 105 and 110 are depicted in FIG. 1A, any number of nodes may be connected to fabric 115. Here, for example, node 105 may represent a plurality of nodes used by a first customer (customer A) and node 110 may represent a plurality of nodes used by a second customer (customer B).

Nodes 120 and 125 represent storage devices of any type known in the art. Although only 2 storage devices are shown connected to fabric 115, any number of storage devices may be employed.

Depending on the specific implementation of network 100, network devices 135, 140 and 145 may be of any type known in the art, such as switches or routers. A customer may interact with network devices 135, 140 and/or 145 by using functional software such as that described above with reference to FIG. 1. In some cases, network devices 135, 140 and/or 145 may be shipped to a customer including such functional software.

As with the other components of network 100, only a minimal number of network devices have been shown for the sake of simplicity. However, many more network devices would be included in a typical fabric 115. In one example, network devices 135, 140 and 145 are switches used to implement a SAN and/or a plurality of VSANs. In some preferred embodiments of the present invention, network devices 135, 140 and 145 are connected via optical fiber. In some embodiments, communication between these network devices is conducted via Fibre Channel ("FC") protocol. The components of an exemplary network device will be described below with reference to FIG. 10.

Network 100 is connected to Internet 130, allowing nodes 105 and 110 to access other servers, storage area networks, etc. As described below, some implementations of the present invention involve the distribution of debug plug-ins from a secure site on Internet 130 to a node or a network device.

Customers operating nodes 105 or 110 may communicate with network devices 135, 140 and 145 using a variety of protocols, for example command line interface ("CLI"), simple network management protocol ("SNMP"), or a web browser.

Figure 2:
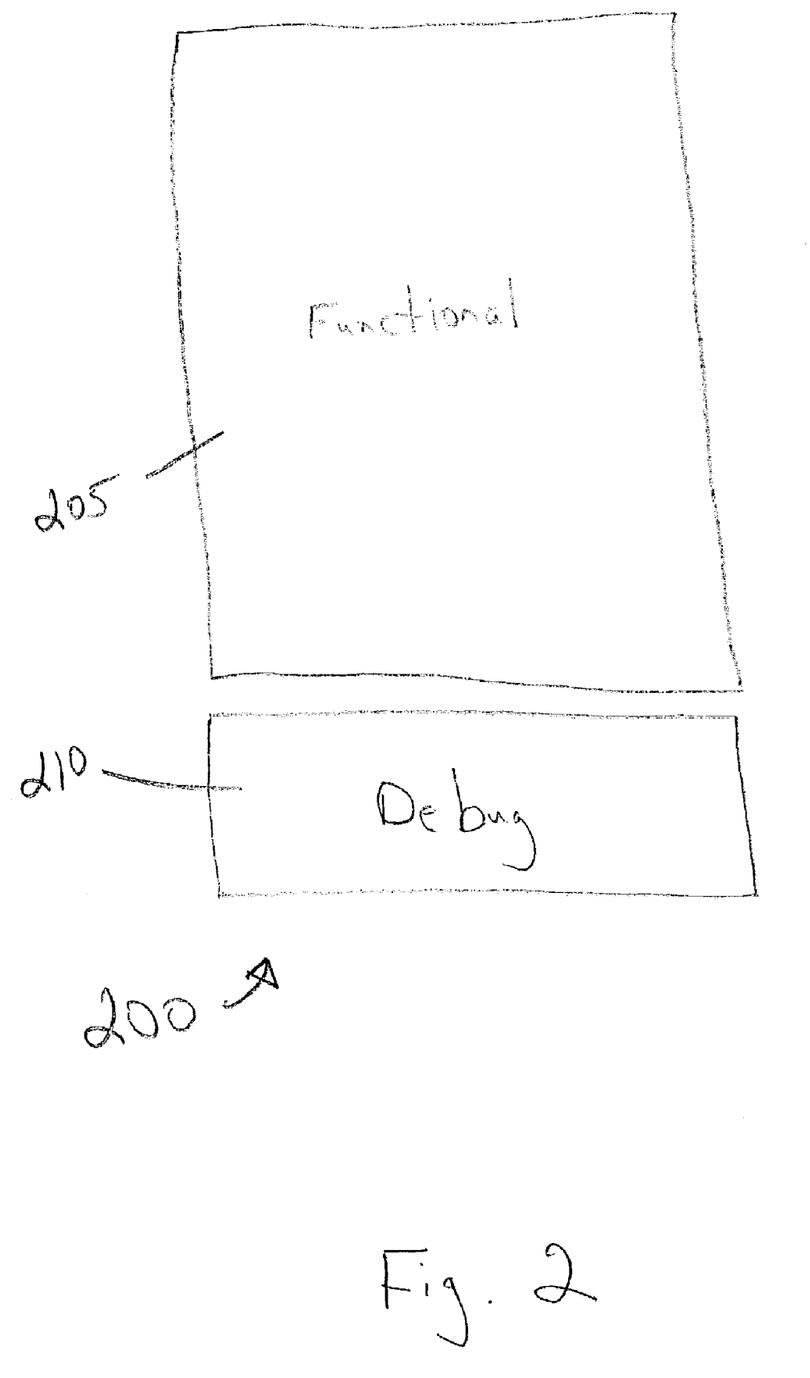
FIG. 2 is a block diagram that illustrates functional and debugging portions of software for controlling one or more network devices.

FIG. 2 illustrates software 200 according to some aspects of the invention. Software 200 includes functional software 205 and debug software 210. Functional software 205 is accessed by commands such as those of command groups 101, 102 and 103 described above with reference to FIG. 1. Functional software 205 includes executable files, data files, etc., that are required for a network device to function properly. Debug software 210 includes software for troubleshooting and debugging functional software 205. Debug software 210 is controlled by engineering command group 106.

As noted above, putting debug software 210 in the hands of a customer can lead to various problems. However, in the past debug software 210 has been shipped to customers who purchase network devices. Access to debug software has been made more difficult, but not impossible, by adding a password known only by the developers of that software. However, if the password becomes known by others, the previously-mentioned problems will ensue.

One solution to these problems is to ship the network device with debug software 210 and to include documentation for debug software 210. This approach is problematic for several reasons. First, providing documentation for debug software 210 would be time-consuming and would therefore take a significant amount of software developers' time away from other projects. Moreover, although having proper documentation would reduce the likelihood of a customer's misuse of such software, the potential for misuse would still be there. The vendor and/or manufacturer may be unwilling to cover problems under a warranty that were caused by software that the customer was not supposed to use. Determining whether problems were actually caused by debug software 210 could be difficult and could lead to disputes and customer dissatisfaction. In addition, confidential information regarding the software code that controls the network devices would still be delivered along with debug software 210.

Another solution is to have debug software 210 available during the development phase of functional software 205, but then to remove debug software 210 when functional software 205 is shipped. In some instances, this shipment would occur when a network device that includes functional software 205 is shipped. However, this approach would require either (1) having the vendor send the customer a special version of software combining both functional software 205 and debug software 210; or (2) having the customer send an image of buggy functional software 205 back to the vendor for testing. This would require the vendor to simulate the customer's operating environment in order to test functional software 205 without accessing the customer's premises.

The former approach was not found to be acceptable to customers, in part because the combined software was not the same software that was found to have a problem. Moreover, shipping the combined software caused the previously described problems of placing dangerous tools and confidential information in the hands of a customer. The latter approach caused unacceptable periods of down-time for the customer's network.

Figure 3:
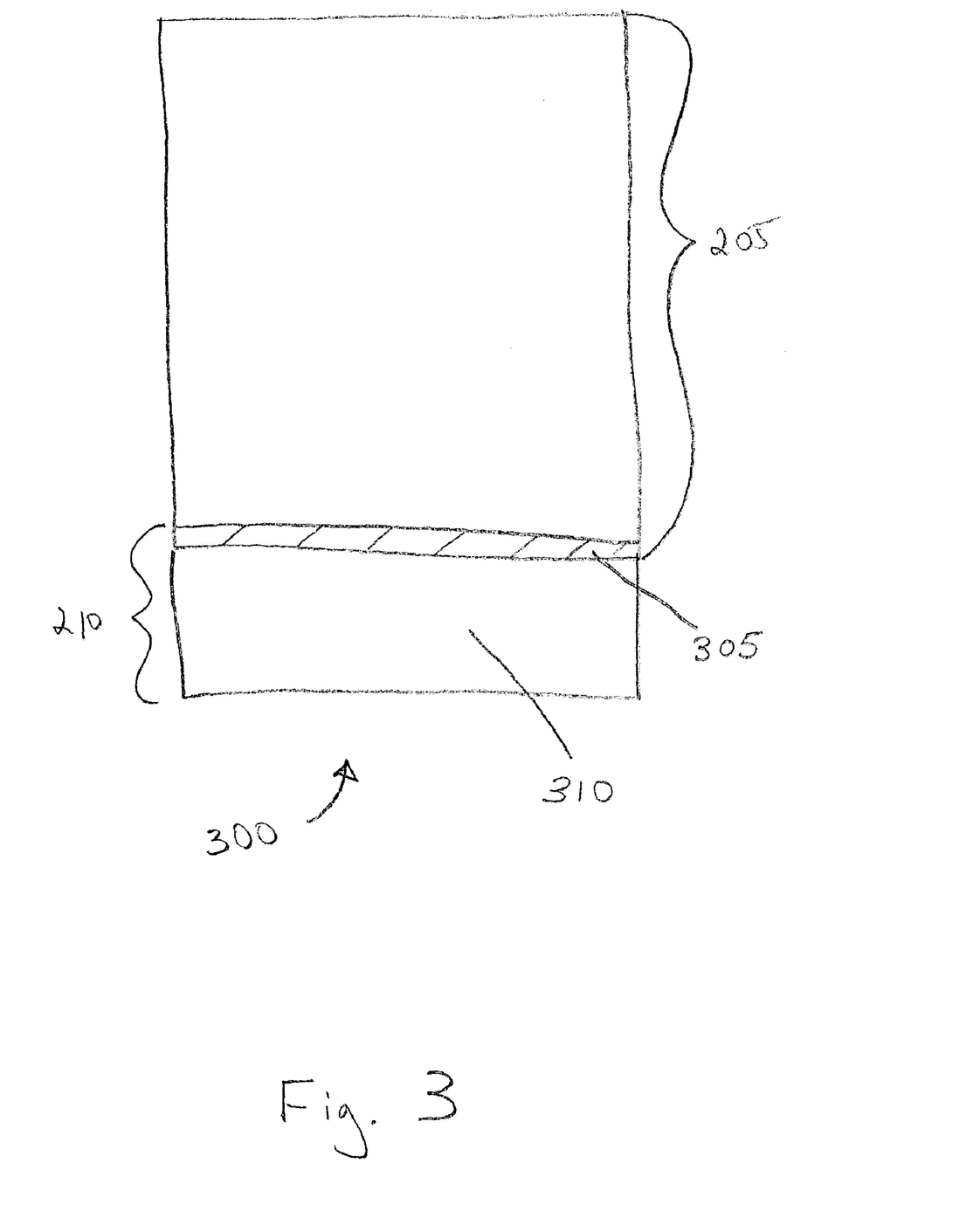
FIG. 3 is a block diagram that illustrates alternative versions of functional and debugging portions of software for controlling one or more network devices.

FIG. 3 depicts alternative software 300, in which debug software 210 and functional software 205 overlap: here, both debug software 210 and functional software 205 include part 305. In preferred implementations of the invention, part 305 is shipped with functional software 205, though the privileges for using the commands of part 305 are preferably not made available except on an as-needed basis. In other words, when software 205 is shipped, the privileges for using the commands of part 305 are preferably withheld until the vendor determines, e.g., that the customer's functional software 205 needs high-level troubleshooting and/or debugging. In order to "unlock" or gain access to the commands of part 305, a password, a key, etc., may be required.

Debug software also includes portion 310, which includes additional debugging and troubleshooting commands not found in part 305. According to some implementations of the invention, portion 310 is made available as a plug-in that may be installed after functional software 205 has been shipped to a customer. This process will be described in more detail below.

Figure 4:
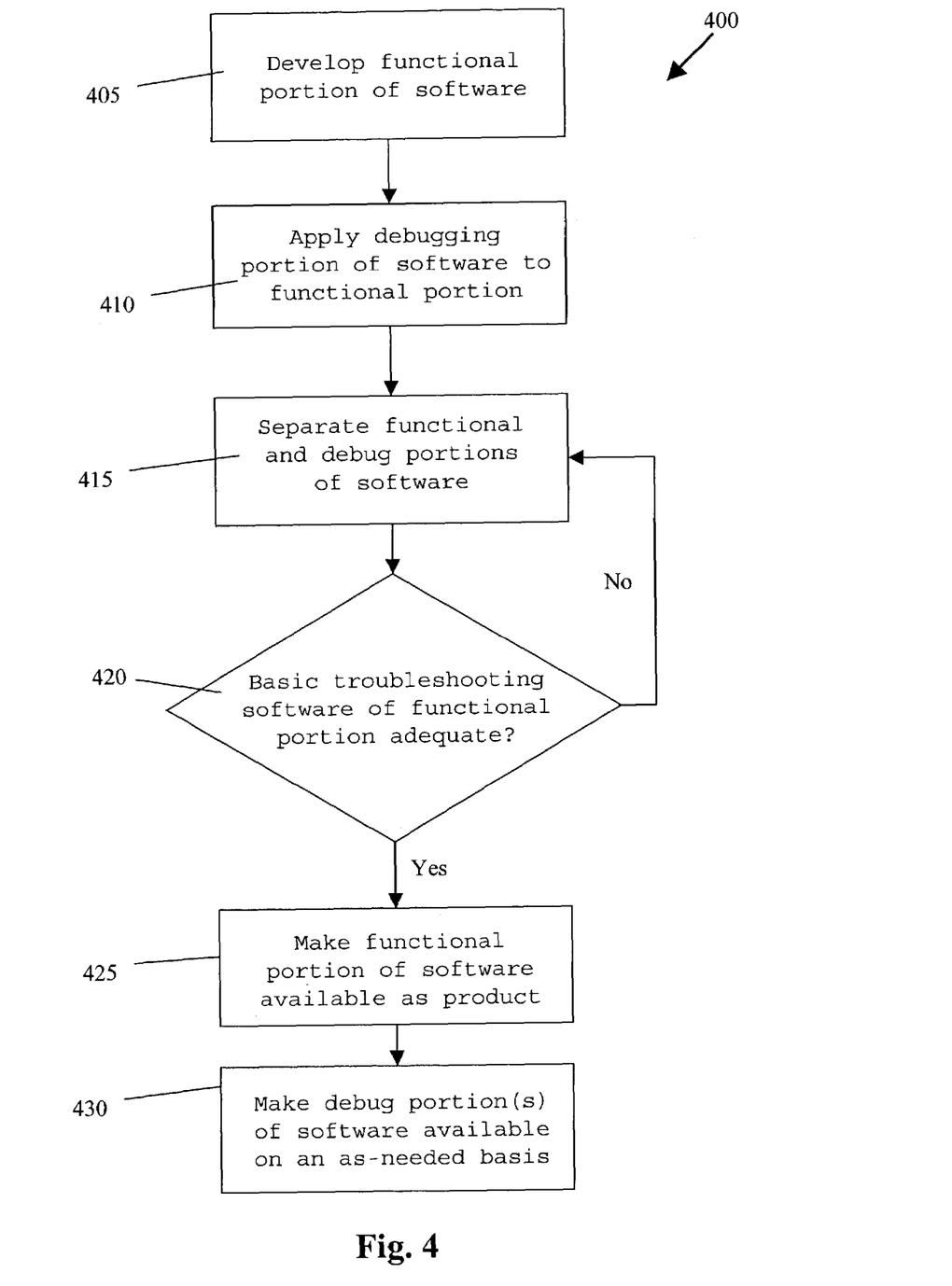
FIG. 4 is a flow chart that outlines a process of developing functional and debugging portions of software for controlling one or more network devices.

FIG. 4 is a flow chart that illustrates method 400 of the present invention. In step 405, functional software portion 205 is developed, e.g., by a vendor such as the present assignee. In step 410, debug software portion 210 is applied to troubleshoot and debug functional software portion 205. During this process, debug software portion 210 is also developed, as needed, to develop functional software portion 205. Although steps 405 and 410 are shown as two sequential steps, one of skill in the art will appreciate that the process of developing and debugging software, including functional software portion 205, is to some degree an iterative process.

In step 415, functional software portion 205 is separated from most (or all) of the debug software portion. According to some implementations, functional software portion 205 and debug software portion 310 are separated in the manner described above with reference to FIG. 3, wherein part 305 of debug software portion 210 remains with functional software portion 205. In any event, functional software portion 205 should include basic troubleshooting software for use by the customer.

In step 420, the separated functional portion 205 is tested to see if it works properly without the debug portion. Debugging and troubleshooting are performed, as needed. Preferably, step 420 is performed only with the basic troubleshooting software which will be made available for use by the customer. If the separated functional portion 205 works properly without the debug portion and the basic troubleshooting software is adequate for the separated functional portion 205, the process continues to step 425. If not, the process returns to step 415. Then, the separation process is modified, e.g., to include more troubleshooting and/or debugging software in the separated functional portion 205. The separating and testing steps continue until a satisfactory result is attained in step 420.

Preferably, as much software as possible should be moved to debug software portion 310, in order to reduce the size of the software shipped to customers and also to reduce the amount of confidential data distributed in the public. In an ideal world, part 305 would be empty. However, a need for a trade off exists in the real world, because technical and time constraints require software developers to minimize the number of cycles between steps 415 and 420.

For instance, many commands (e.g., Unix commands) may be distributed with functional software portion 205 only because the software developers cannot determine whether functional software portion 205 will try to use them or not. If those commands do not include any confidential information, the risk of removing them (and potentially causing a malfunction of functional software portion 205) just to deliver a more compact software product may not justify the effort and the extra testing time required.

Examples of Unix commands that may be left within portion 305 include "file", "objdump", "ldd" and "vi." "vi" is an editor that allows a developer to modify internal text data files on the fly. This operation should not be made available to end users because the internal text data files are not documented and erroneous contents can cause the system to misbehave. However, valid contents can help troubleshoot a genuine bug. "ldd" shows the dynamic linking configuration of other executables. As such, "ldd" can't cause any harm if used by an inexperienced user, but still, it shows output that is not easy to understand unless well documented. "objdump" and "file" show information about files, and suffer the same problems of "ldd".

In many implementations, the foregoing commands are sitting idle in the file system because nothing in functional software portion 205 can trigger their use. However, when debug plug-in 310 is loaded, all these commands can prove very useful for an enhanced debugging session.

An example of a command that should not be left in portion 305 is the Linux tool "strace," a program that can attach to a running process and trace all the system calls the process is doing. The "strace" command is a very verbose command and if used carelessly it can waste CPU with the excessive output resulting from the command, thereby taking away resources that could be used by the regular functional software. In a worst-case scenario, the "strace" command can cause a device to reboot. Moreover, by tracing the system calls of any process, competitors could better understand what a process is doing, and how the process is doing it, effectively taking advantage of undisclosed confidential material such as the functional/design software specification for that process.

For all these reasons, the extra efforts required to put "strace" (or other potentially troublesome commands) in debug portion 310 are worth the time spent cycling between steps 415 and 420. As a result, debug portion 310 should include the "strace" program (and similar programs) and the command line interface that allows users to invoke "strace". These features do not need to be in functional software portion 205 because no functional component should ever try to use the services of "strace." Leaving such commands in portion 305 is not worth the risk.

In step 425, functional software portion 205 is made available to customers. Step 425 may involve installing functional software portion 205 in a network device and offering the network device for sale. Alternatively, step 425 may involve the creation of a software product that is made available to a customer online or stored in a storage medium.

In step 430, at least a part of debug portion 210 is made available for debugging and troubleshooting functional software portion 205 after it has been shipped to a customer. Although the software of portion 310 may be made available in any convenient way, it is preferably made available by supplying portion 310 as a plug-in that may be downloaded from a secure site and/or stored in a storage medium. Preferably, executable software, files, etc., are selected from debug portion 210, compressed and made into a format suitable for use as a debug plug-in.

Some problems can be resolved by unlocking part 305, which is preferably shipped with functional software portion 205. Therefore, step 430 may involve only those steps necessary to unlock part 305, e.g., by providing a new password or by using a debug plug-in to allow access to engineering group commands associated with part 305. Such access may be granted by revising a portion of the customer's file system (e.g., files in a directory associated with functional software portion 205) with password files of the debug plug-in.

On the other hand, some problems will require making additional software and/or files of portion 310 available. If so, additional files from the debug plug-in may be added to a directory associated with functional software portion 205.

Preferably, the part of debug portion 210 (e.g., the plug-in) is only accessible for a limited period of time, e.g., during the process of debugging and troubleshooting functional software portion 205. After this limited period of time, the plug-in will preferably be deleted by a user. In some implementations, the plug-in will disable itself by methods known to those of skill in the art.

Figure 5:
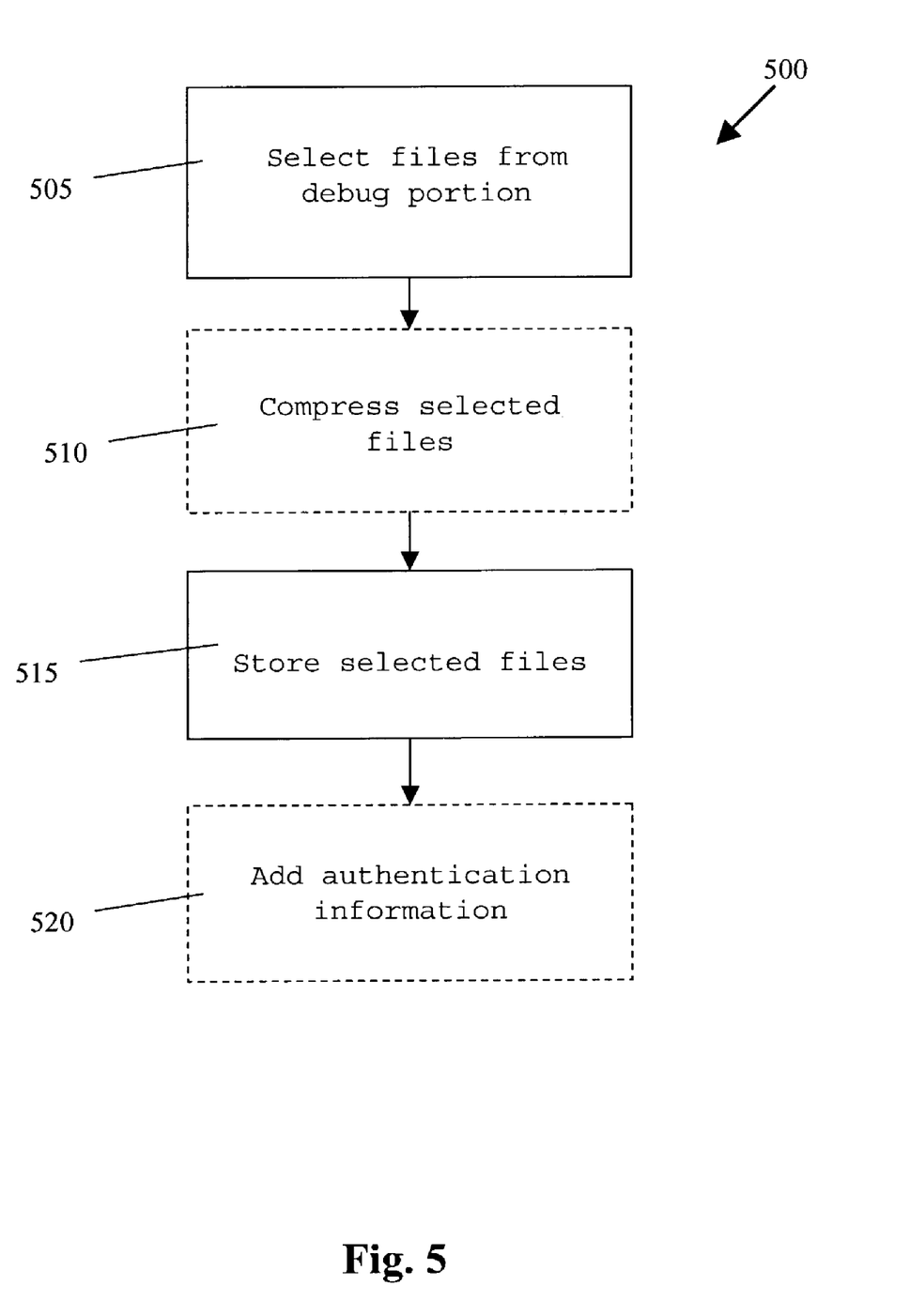

A generalized process 500 for making a debug plug-in is outlined in the flow chart of FIG. 5. In step 505, executable software files, data files, etc., are selected from debug portion 210 or 310. As noted above, such files may include password files necessary to allow access to engineering group commands associated with part 305. The files selected in step 305 may include other executable files or data files needed to provide the functionality of other parts of debug portion 210 or 310.

In optional step 510, the files selected in step 505 are compressed. As is well known to those of skill in the art, data compression offers many advantages with respect to data storage and transmission. Step 510 is particularly advantageous if the debug plug-in will be made available for downloading via the Internet. In step 515, the selected files are stored.

In optional step 520, authentication and/or error checking capabilities are added to the selected and stored files. Preferably, checksum or similar error-checking functionality is added to the debug plug-in, e.g., to check for file corruption when the debug plug-in is downloaded. Moreover, it is preferred that some form of "signature" or other authentication mechanism known by those of skill in the art is enabled to ensure that: (1) the debug plug-in is accessible only to authorized users and (2) the debug plug-in has not been corrupted. For example, the authentication mechanism could include an encrypted checksum that is used to verify the result of another unencrypted checksum.

Figure 6:
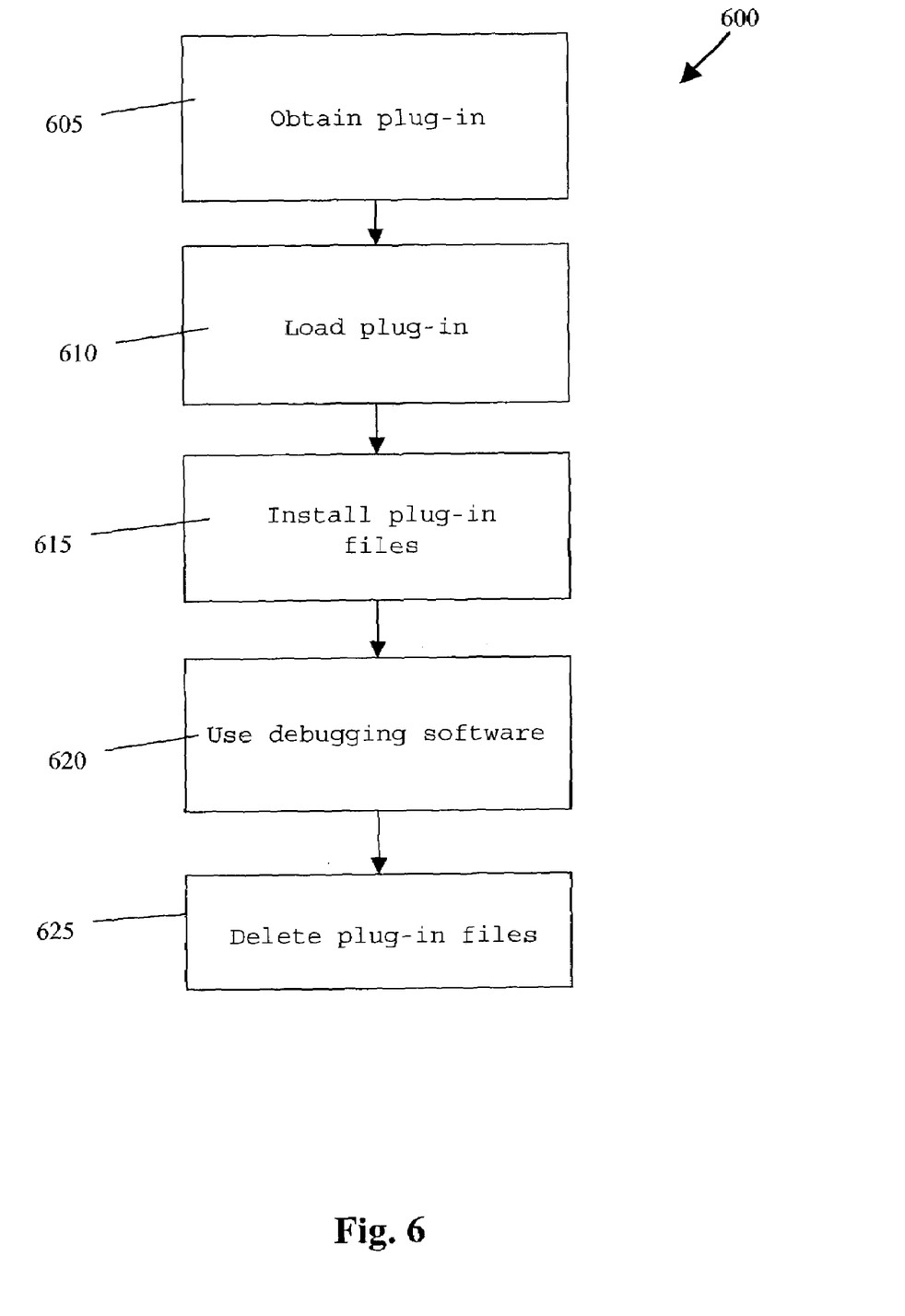

A generalized process for using a debug plug-in is outlined in the flow chart of FIG. 6. In step 605, the debug plug-in is obtained. As noted above, in some implementations the debug plug-in is obtained by downloading from a secure website. However, in other implementations, the debug plug-in is made available on a portable storage medium, such as an optical storage medium.

In step 610 the debug plug-in is loaded. In general, the debug plug-in will be loaded on a network device and/or a node controlled by a customer, in order to perform debugging operations on functional software installed on the customer's network device or devices. In step 615, selected files from the debug plug-in are installed on the customer's network device and/or node. For example, a password file supplied by the debug plug-in may be used to replace or update a password file stored on the network device and/or node.

In step 620, debugging software that has been made available by the debug plug-in is used for the required debugging/troubleshooting operation. Preferably, in step 625 the files installed in step 615 are deleted and files stored on the network device and/or node are returned to their previously-existing condition.

Figure 7:
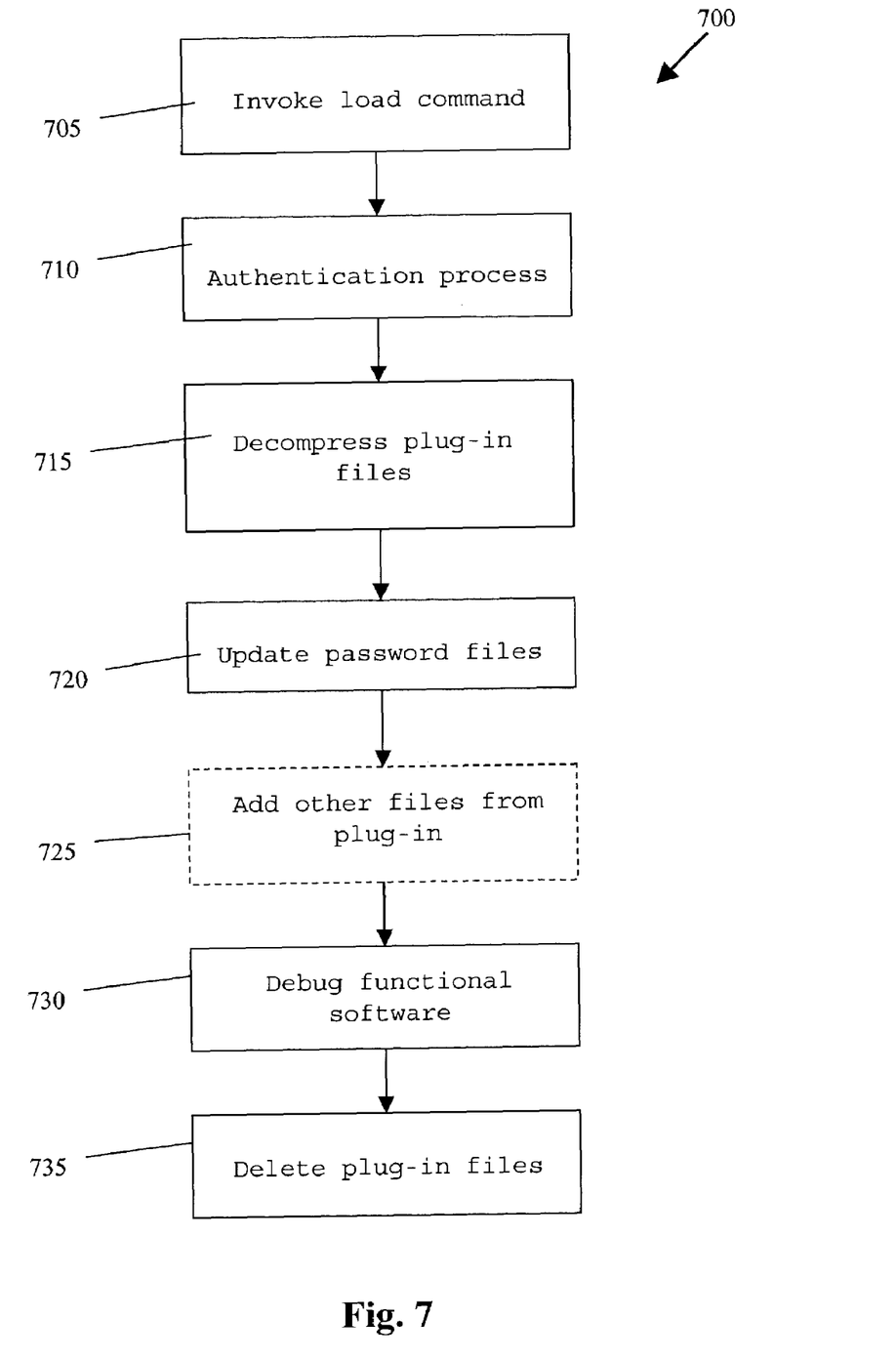

A more detailed process for using a debug plug-in is outlined in the flow chart of FIG. 7. In step 705, the debug plug-in has already been obtained and a load command is invoked to initiate the process of loading and installing the debug plug-in. In step 710, an authentication process of any convenient type known in the art is invoked. As noted above, some form of signature mechanism is preferably enabled to ensure that the debug plug-in is accessible only to authorized users, that the debug plug-in has not been corrupted and that only a trusted entity has created the plug-in. For example, a user may need to use a password, a key or other procedures known by those of skill in the art.

In this example, the files of debug plug-in have previously been compressed. Accordingly, such files are decompressed in step 715. In step 720, a password file included in the debug plug-in is used to update a password file associated with debug portion 210 and/or 310. For example, step 720 may enable commands of an "admin account" or a "root account" that enable different levels of commands of engineering command group 106. In some implementations, the enabled commands are for controlling files that are included in part 305 of functional software portion 205.

In step 725, additional files are selected from the debug plug-in and installed on the customer's network device and/or node. For example, the additional files may have been selected from portion 310, which includes additional debugging and troubleshooting commands not found in part 305.

In step 730, debugging software that has been made available by the debug plug-in is used for the required debugging/troubleshooting operation. Preferably, in step 735 the files installed in step 720 (and step 725, if applicable) are deleted and files stored on the network device and/or node are returned to their previously-existing condition.

Figure 8:
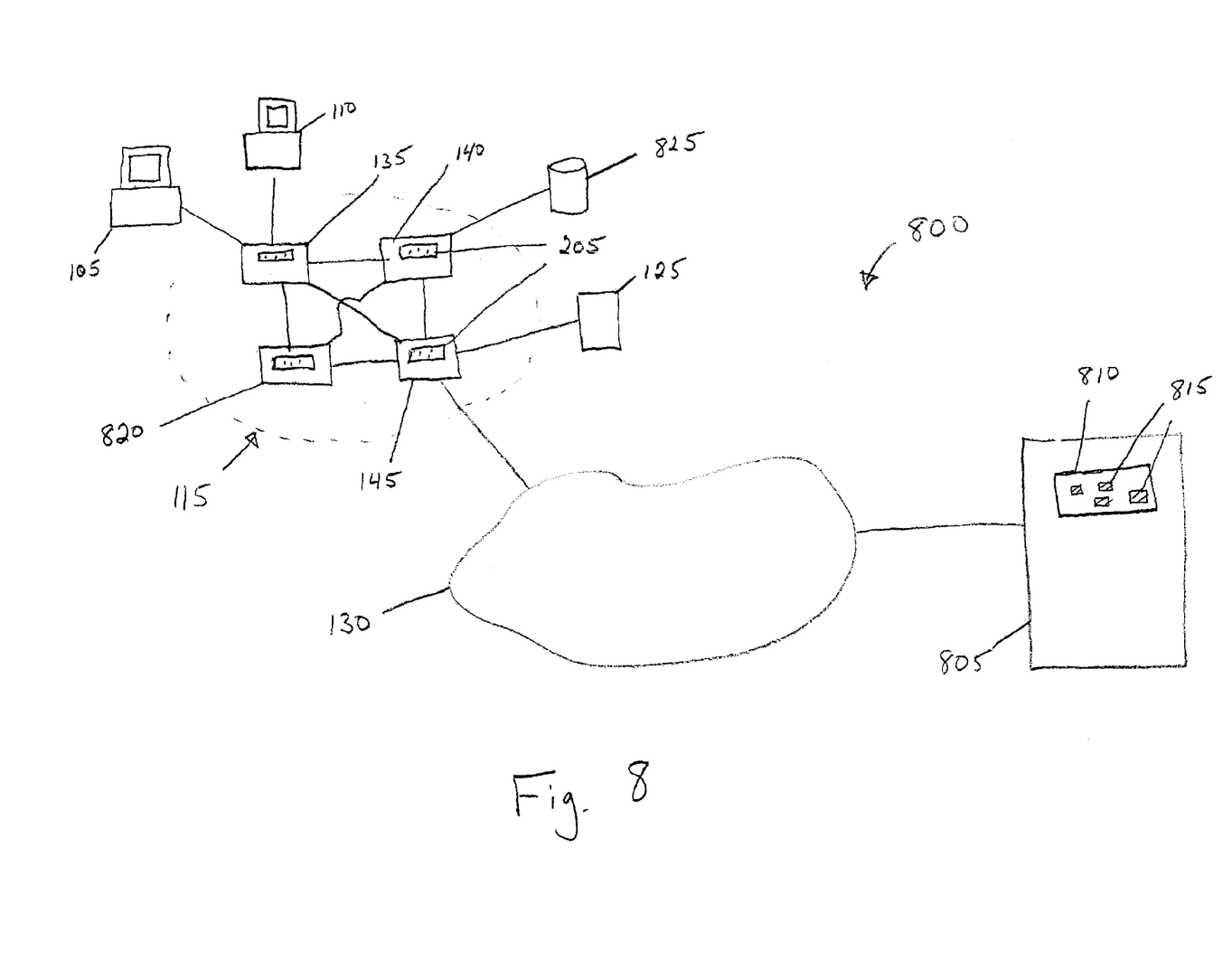
FIG. 8 is a network diagram that depicts debug plug-ins stored in a server controlled by a vendor.
Figure 9:
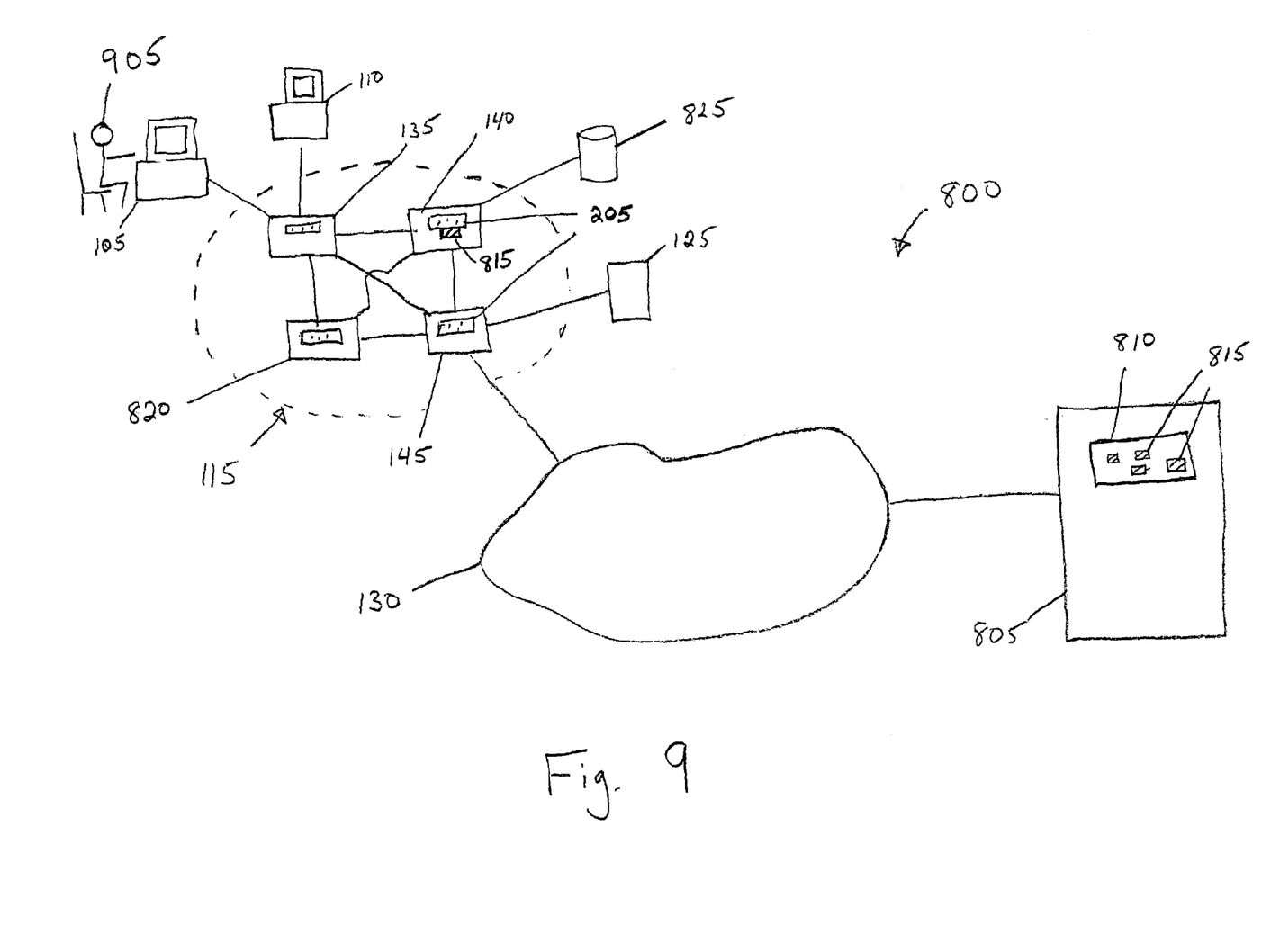
FIG. 9 is a network diagram that depicts the delivery of a debug plug-in to a network device.

FIGS. 8 and 9 illustrate one implementation of the present invention for making debug plug-ins available. Server 805 of FIG. 8 is preferably a secure server controlled by the vendor that developed functional software portion 205 and debug software portion 210 (e.g., Andiamo Systems). Within the meaning of this application, the term "vendor" is not limited to the person or entity that sold functional software portion 205: in some instances, the software developing entity may be different from the selling entity. In such instances, the term "vendor" should be broadly construed to include either the software developer or seller.

Server 805 includes memory 810, in which various debug plug-ins 815 are stored. These different debug plug-ins 815 may be based upon different versions of debug software portion 210. Alternatively, the various debug plug-ins 815 may have been created from the same version of debug software portion 210, but were created using different selected parts of debug software portion 210.

Server 805 is accessible from network 115 via Internet 130. Here, network 115 includes an additional network device 820 and storage device 825. Each network device of network 115 is controlled, at least in part, by functional software portion 205. In some implementations, at least some of functional software portion 205 is installed in memory accessible to one of nodes 105 and/or 110.

In FIG. 9, operator 905 has controlled node 105 to cause one of debug plug-ins 815 to be downloaded from server 805 and installed in network device 140 in the manner described above. Then, operator 905 may use debug plug-in 815 to troubleshoot and/or debug functional software portion 205. Preferably, after operator 905 has completed these tasks, debug plug-in 815 is deleted and the files and commands accessible to network device 140 are returned to their previous state.

Preferably, operator 905 is acting under the authority of the vendor. Operator 905 may be, for example, an engineer employed by the vendor and sent to troubleshoot and/or debug functional software portion 205. Alternatively, operator 905 may be another person authorized by the vendor to perform these tasks. For example, operator 905 may be a third party service provider or someone employed or hired by the customer who controls node 105 (here, customer A).

Figure 10:
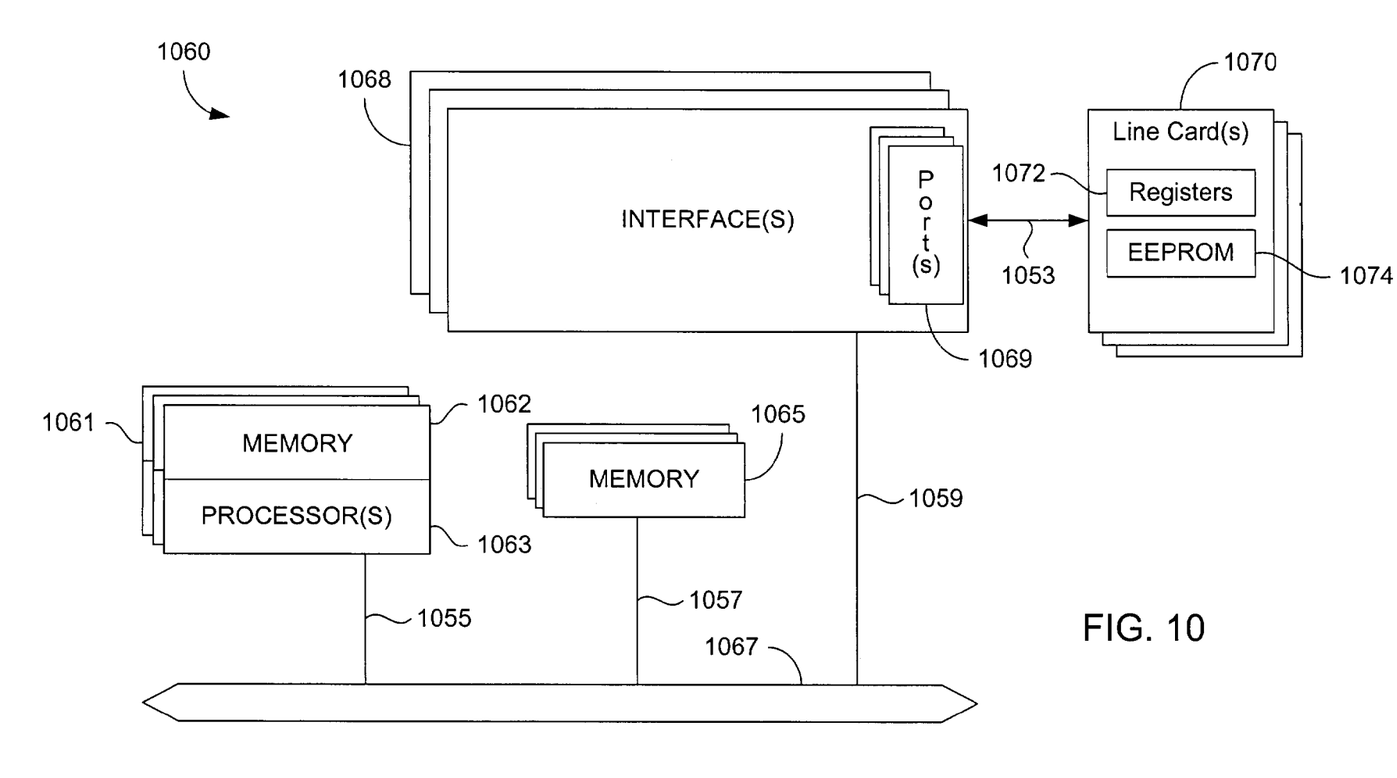
FIG. 10 illustrates a network device that may be used in implementing the present invention.

Referring now to FIG. 10, a network device 1060 suitable for implementing the techniques of the present invention includes a master central processing unit (CPU) 1062, interfaces 1068, and a bus 1067 (e.g., a PCI bus). When acting under the control of appropriate software or firmware, the CPU 1062 may be responsible for implementing specific functions associated with the functions of a desired network device. For example, when configured as an intermediate router, the CPU 1062 may be responsible for analyzing packets, encapsulating packets, and forwarding packets. The CPU 1062 preferably accomplishes all these functions under the control of software including an operating system (e.g. Windows NT), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

The interfaces 1068 are typically provided as interface cards (sometimes referred to as "line cards"). Generally, they control the sending and receiving of data packets over the network and sometimes support other peripherals used with the network device 1060. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1062 to efficiently perform routing computations, network diagnostics, security functions, etc.

Although the system shown in FIG. 10 illustrates one specific network device of the present invention, it is by no means the only network device architecture on which the present invention can be implemented. For example, an architecture having a single processor that handles communications as well as routing computations, etc., is often used.

Further, other types of interfaces and media could also be used with the network device.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Aspects of the invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A method of controlling access to debugging software for debugging a software code that controls one or more network devices, the method comprising:
   developing, by a vendor, a first software module that comprises:
      a functional portion for day-to-day management and configuration of one or more network devices; and
      a debugging portion for debugging and troubleshooting the functional portion;
   forming a second software module by removing at least a first part of the debugging portion from the first software module;
   shipping the second software module to a customer; and
   providing, after the second software module has been shipped to the customer, at least a second part of the debugging portion for debugging the second software module.

2. The method of claim 1, wherein the forming step comprises leaving a third part of the debugging portion as part of the second software module, and wherein the shipping step comprises shipping the functional portion and the third part of the debugging portion to the customer.

3. The method of claim 1, wherein the forming step comprises leaving no part of the debugging portion as part of the second software module.

4. The method of claim 1, wherein the providing step comprises forming the second part of the debugging portion as a plug-in and making the plug-in available to an operator for debugging and troubleshooting the functional portion.

5. The method of claim 1, further comprising the step of testing the second software module prior to the shipping step.

6. The method of claim 1, wherein the providing step comprises providing the second part of the debugging portion to an operator acting under the authority of the vendor.

7. The method of claim 2, wherein the providing step comprises granting permission to unlock the third part of the debugging portion.

8. The method of claim 4, wherein the plug-in is only accessible for a limited period of time.

9. The method of claim 5, further comprising the step of making available a command group for controlling the second part of the debugging portion, wherein the testing step is performed with the command group.

10. The method of claim 5, wherein the testing step is performed with software included in the second part of the debugging portion.

11. A debug plug-in for controlling a computing device to perform troubleshooting and debugging operations, the debug plug-in formed according to the following process:
   developing a first software module that comprises:
      a functional portion for day-to-day management and configuration of one or more network devices; and
      a debugging portion for debugging and troubleshooting the functional portion;
   removing files from at least a part of the debugging portion; and
   storing the removed files in a computer-readable storage medium,
   wherein the computer-readable storage medium is provided to the customer after the first software module has been shipped to the customer.

12. The debug plug-in of claim 11, wherein the debug plug-in is formed by the additional step of compressing the selected files before the selected files are stored in the computer-readable storage medium.

13. The debug plug-in of claim 11, wherein the debug plug-in is formed by the additional step of adding authentication information to the selected files before the selected files are stored in the computer-readable storage medium.

14. A network device having a first software module comprising a functional portion that includes software for day-to-day management and configuration of the network device, the network device configured to download a plug-in comprising a second software module for debugging the first software module, the second software module comprising first software module development software, said second software module subsequently removed after development of the first software module and provided to a customer after the first software module has been shipped to the customer.

15. The network device of claim 14, further configured to revise a password file according to information in the second software module.

16. The network device of claim 14, further configured to select software from the second software module to debug the functional portion.

17. The network device of claim 15, further configured to select software from the first software module to debug the functional portion.

* * * * *